United States Patent [19]
Woldenberg et al.

[11] Patent Number: 5,597,308
[45] Date of Patent: Jan. 28, 1997

[54] ASSEMBLY INCLUDING INTERLOCKING COMPONENTS FOR TEACHING MATHEMATICAL CONCEPTS

[76] Inventors: Richard Woldenberg, 176 Hastings, Highland Park, Ill. 60035; Lisa Hoffman, 102 N. Maple St., Mt. Prospect, Ill. 60056

[21] Appl. No.: 340,599

[22] Filed: Nov. 16, 1994

[51] Int. Cl.$^6$ .................................. G09B 1/06
[52] U.S. Cl. ........................... 434/196; 434/195
[58] Field of Search ................................ 434/195, 196, 434/207, 188, 191

[56] References Cited

U.S. PATENT DOCUMENTS

| | | | |
|---|---|---|---|
| 1,151,279 | 8/1915 | Lewis | 434/195 |
| 1,428,206 | 9/1922 | Benton | 434/195 |
| 1,649,578 | 11/1927 | Deming | 434/196 |
| 2,494,469 | 1/1950 | Booth | 434/196 |
| 2,611,193 | 9/1952 | Davis . | |
| 2,835,988 | 5/1958 | Hilkene | 434/195 |
| 3,094,792 | 6/1963 | Morgan . | |
| 3,171,217 | 3/1965 | Birdsall . | |
| 3,204,343 | 9/1965 | Pollock | 434/195 |
| 3,414,986 | 12/1968 | Stassen | 434/195 |
| 3,636,230 | 1/1972 | Tacey . | |
| 4,914,019 | 4/1990 | Chu | 434/196 X |
| 5,137,452 | 8/1992 | Pollock . | |
| 5,176,577 | 1/1993 | Pollock . | |
| 5,238,407 | 8/1993 | Pollock . | |
| 5,238,408 | 8/1993 | Pollock . | |
| 5,297,965 | 3/1994 | Manancero | 434/208 X |

FOREIGN PATENT DOCUMENTS

| | | |
|---|---|---|
| 8502207 | 5/1985 | Brazil . |
| 2410319 | 11/1977 | France . |
| 1954660 | 2/1967 | Germany . |
| 7730826 | 1/1978 | Germany . |
| 9003865.7 | 2/1992 | Germany . |
| 1372163 | 10/1974 | United Kingdom . |

OTHER PUBLICATIONS

"Rainbow Fraction Tiles", manufactured by Learning Resources, Inc. of Lincolnshire, Illinois (1992).

"Fraction Stax ®", manufactured by Ideal School Supply Company, Oak Lawn, Illinois (1992).

"Fraction Bars", manufactured by Scott Resources, Fort Collins, Colorado 1991.

Primary Examiner—Jeffrey A. Smith
Attorney, Agent, or Firm—Laff, Whitesel, Conte & Saret, Ltd.

[57] ABSTRACT

An assembly for teaching mathematical concepts includes a plurality of interlocking components, each having at least one connecting end so that the components can be combined in any order or length. Each component is assigned a mathematical value according to its length, and this value may be indicated by indicia on its face or by color coding. A base is also provided for retaining the columns of components in vertical formations. Means are provided on the platform of the base for engaging the bottom component in each column.

13 Claims, 3 Drawing Sheets

ASSEMBLY INCLUDING INTERLOCKING COMPONENTS FOR TEACHING MATHEMATICAL CONCEPTS

FIELD OF THE INVENTION

This invention relates generally to an assembly for teaching mathematical concepts and, more particularly, to interlocking components used to teach various mathematical operations and concepts such as fractions, percents and decimals.

BACKGROUND OF THE INVENTION

Many students find certain mathematical concepts extremely difficult. Fractions, percents and decimals, in particular, are hard to conceptualize, especially if they are used in computations such as addition, subtraction, multiplication and division. Some of this difficulty in understanding may be attributed to the way in which fractions, percents and decimals are taught. If they are merely explained orally and/or in writing on a chalkboard, students may not grasp the abstract concepts or calculations as well as they could if they had actual objects representing fractions, percents and decimals to see and touch. In addition, complex ideas such as fractions exceeding one ("improper fractions") or converting from fractions to mixed numbers (whole numbers summed with fractions, for e.g. 1¾) are difficult to model even in writing.

Currently, there are various teaching aids which attempt to assist students in visualizing, describing and understanding some of these fraction concepts, all of which suffer some significant shortcomings or limitations. For example, Fraction Bars® by Scott Resources (P.O. Box 2121, Ft. Collins, Colo. 80522) is a program which uses activities, games, worksheets and tests to teach fraction concepts and operations. Fractions Bars® includes a set of color-coded plastic strips which contain fractional increments and shaded portions to represent parts of a whole. In addition, Rainbow Fraction Tiles™ by Learning Resources (675 Heathrow Drive, Lincolnshire, Ill. 60069) is designed to aid students in manipulative activities essential for understanding fractions. Rainbow Fraction Tiles are color-coded plastic tiles of different sizes with fractional designations printed on each one. The length of each tile corresponds to its fractional designation. For example, the largest tile (which represents one whole) is red and has the number "1" printed on it, the next two tiles (which together equal the length of the one whole tile) are pink and have the fraction "½" printed on each, etc. Unfortunately, these two teaching devices are rather limited in their application. Although the Fraction Bars and Rainbow Fraction Tiles offer an effective means by which to compare fractions and learn basic concepts, performing a range of mathematical calculations, such as addition, subtraction, multiplication and division (particularly where the result exceeds one), with these devices is very difficult because the fractional components cannot be easily combined into a new unitary whole. Consequently, comparison and exploration of fraction concepts is limited.

Fraction Stax® by Ideal School Supply Company (Oak Lawn, Ill. 60453) overcomes some of these limitations by making it possible for students to compare, order, add and subtract fractions. Fraction Stax® is a three-dimensional fraction model that includes sleeve-like color-coded fraction pieces and a nine-peg base on which the pieces are mounted. The length of each color-coded piece corresponds to the fractional designation which is printed on it. The piece with the number "1" designation is "the whole" and thus the longest piece. The other pieces are halves, thirds, fourths, fifths, sixths, eighths, tenths and twelfths of the whole. The pegs on the base are the same length as the whole. Accordingly, this teaching aid is limited because the fraction pieces cannot be mounted higher than the peg without the risk that they will be knocked over by any slight movement, the fraction pieces are very difficult to use without the base and the number of fractions displayed is limited by the number of pegs on the base. Consequently, improper fractions and mixed numbers cannot be displayed or taught and more complex calculations involving operations of improper fractions or mixed numbers cannot be performed. Further, teachers cannot show students the transition or interchangeability between mixed numbers and improper fractions. This is a major impediment to teaching because a significant portion of math curriculum devoted to fractions concentrates on "conversion," that is from improper fractions to mixed numbers and vice versa.

Therefore, it would be highly desirable to develop mathematical pieces which can be combined independent of a peg, stand or tray. It would also be highly desirable to develop mathematical models which can readily display improper fractions, mixed numbers and other rational numbers. Furthermore, it would be highly desirable to develop mathematical models that can be used to teach complex mathematical concepts and calculations and illustrate the conversion of improper fractions to mixed numbers and vice versa. Finally, it would be highly desirable to develop mathematical models of fractions which can be easily manipulated by a small child.

SUMMARY OF THE INVENTION

The present invention comprises interlocking components which each represent a particular mathematical value. The interlocking components may be combined such that improper fractions, mixed numbers and rational numbers greater than zero can be easily displayed and complex mathematical concepts and calculations, including conversion, can be readily performed.

DETAILED DESCRIPTION OF THE INVENTION

The present invention is directed to an apparatus for teaching mathematical concepts. The apparatus comprises interlocking components 10 which can be used to teach mathematical concepts ranging from basic fraction recognition to complex calculations.

Figure 5:
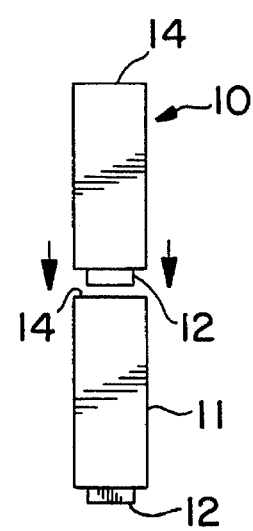
FIG. 5 is an exploded elevation view of two interlocking components.
Figure 6:
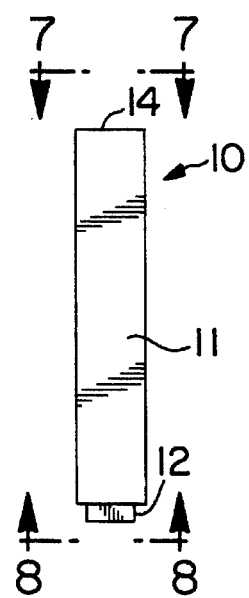
FIG. 6 is an elevation view of an interlocking component.
Figure 7:
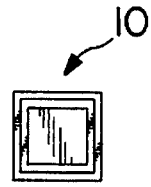
FIG. 7 is a top plan view of an interlocking component taken along line 7—7 of FIG. 6.
Figure 8:
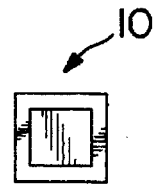
FIG. 8 is a bottom plan view of an interlocking component taken along line 8—8 of FIG. 6.

As shown in FIGS. 5–8, each interlocking component 10 includes a hollow body 11 with a generally square cross-section. Each component 10 has a male end 12 and a female end 14. The male end 12 of the component 10 is an approximately 4 mm long protrusion having a square cross-section smaller than the cross-section of body 11. The female end 14 of the component 10 is an open end of body 11 opposite from the male end 12 and is appropriately sized to receive and frictionally retain the male end 12 of any other interlocking component 10, as shown in FIG. 5. The components 10 may be interlocked either vertically or horizontally.

Figure 1:
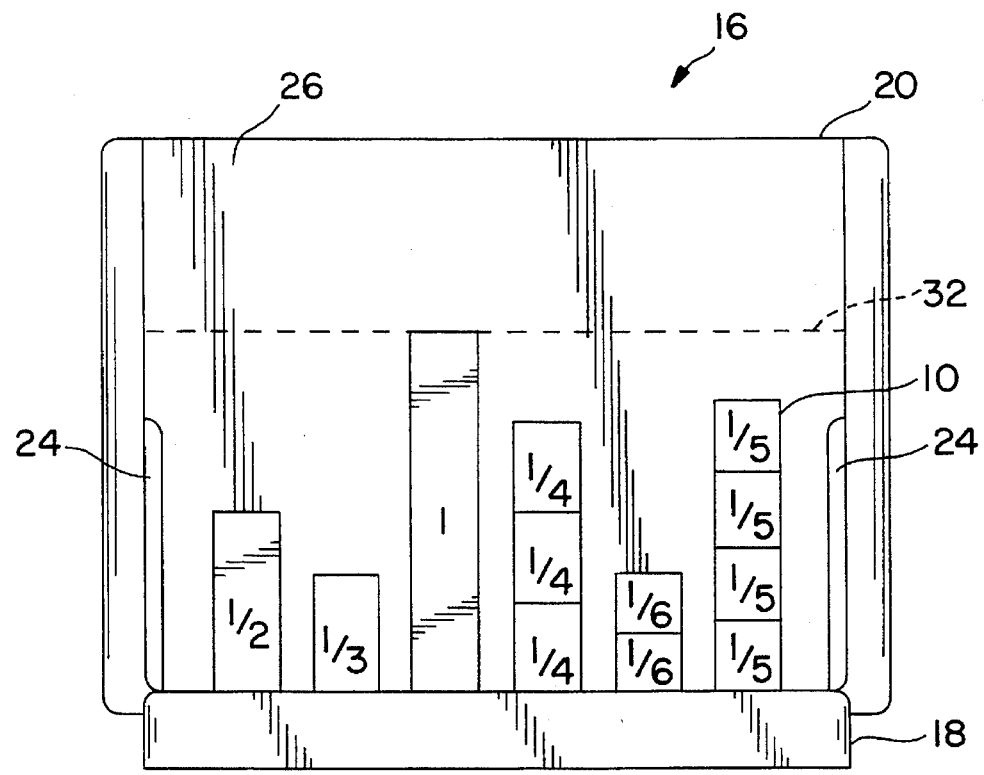
FIG. 1 is a front elevation view of the invention.

Each component 10 is assigned a mathematical value, such as a fraction, percent or decimal, and the value may be printed on one or more of its sides, as shown in FIG. 1. Each component 10 desirably has an external width of 2 cm. The length of each component 10 varies according to its mathematical value as shown in the table below. Components 10 of the same length have the same mathematical value and are of the same color and are thereby noticeably different from other components a different mathematical value both by size and color.

Alternatively, the mathematical values need not be designated on each component 10. Rather, the components 10 could be left blank, thereby allowing the user to draw conclusions about the value of each component 10 based on comparisons of length and/or color. Such conclusions can vary from user to user, as they select different bases for their fraction system, yet each system will be correct and consistent. Comparisons and hence discovery of fraction concepts can be achieved using any of the components as a group. The user can establish the base. For example, the user could select the pink component as the "whole" and do all the same problems with equal success and discovery.

The number of pieces in a typical set of interlocking components 10, as well as the fraction, decimal and percent designations, color and length (not including the male end protrusion) of the components 10 are as follows:

Table
1 each of value "1" or "100%" component—red, 12 cm length
2 each of value "½," "0.50" or "50%" components—pink, 6 cm length
3 each of value "⅓," "0.33" or "33%" components—orange, 4 cm length
4 each of value "¼," "0.25" or "25%" components—yellow, 3 cm length
5 each of value "⅕," "0.20" or "20%" components—green, 2.4 cm length
6 each of value "⅙," "0.167" or "16.7%" components—teal, 2 cm length
8 each of value "⅛," "0.125" or "12.5%" components—blue, 1.5 cm length
10 each of value "⅒," "0.10" or "10%" components—purple, 1.2 cm length
12 each of value "1/12," "0.083" or "8.3%" components—black, 1 cm length Other sets of interlocking components 10 may include different fraction, decimal and percent designations from those described above.

The individual interlocking components 10 can be combined to form new mathematical values, which in turn are used to explore mathematical concepts such as equivalence, percents, fractions, decimals, mixed numbers, operations (i.e., addition, subtraction, division and multiplication), ratios, proportions, patterns, measurements, graphs, models and algebra. The components 10 are appropriate for large group demonstrations as well as for individual activities.

The interlocking components 10 have the unique ability to display improper fractions, which can then be converted to and from mixed numbers. Moreover, the unique interlocking ability allows students to develop comprehension of rational (non-negative) numbers both less than and greater than one.

Figure 3:
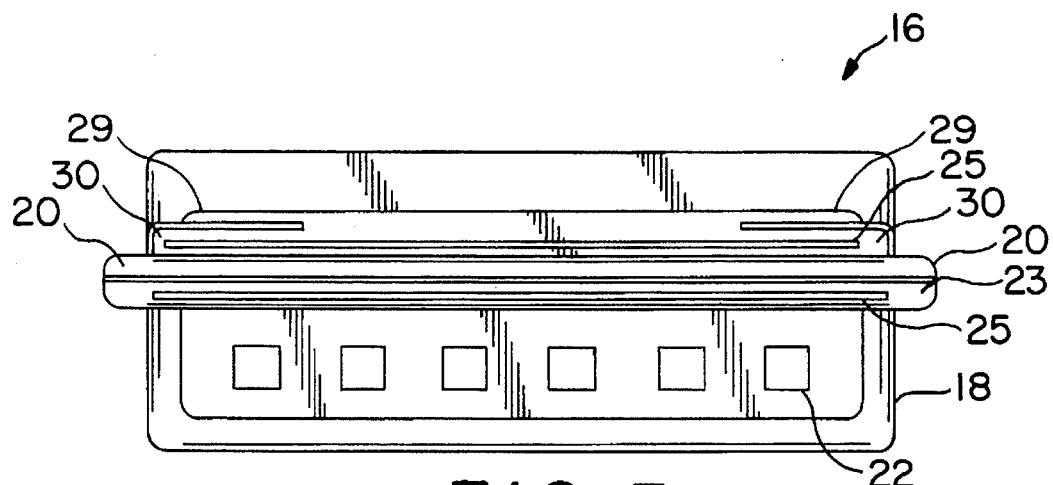
FIG. 3 is a top plan view of the base.

Desirably, the interlocking components 10 are used in conjunction with a base 16 which is comprised of a platform 18 and a rear wall 20, as shown in FIG. 1. The platform 18 contains multiple stations, such as apertures 22, formed therein to accommodate the male ends 12 of the interlocking components 10 so that fraction columns may be built therefrom, as shown in FIG. 3.

The size of the platform 18 is desirably about 24 cm in length, 7 cm in width and 2.54 cm in height. The spacing between the stations 22 is desirably 1.8 cm. The platform 18 permits a side-by-side display of columns. For example, a column of components 10 designated with fraction values and positions at one station may be compared to another column of components 10 designated with decimal values positioned at another station.

Figure 2:
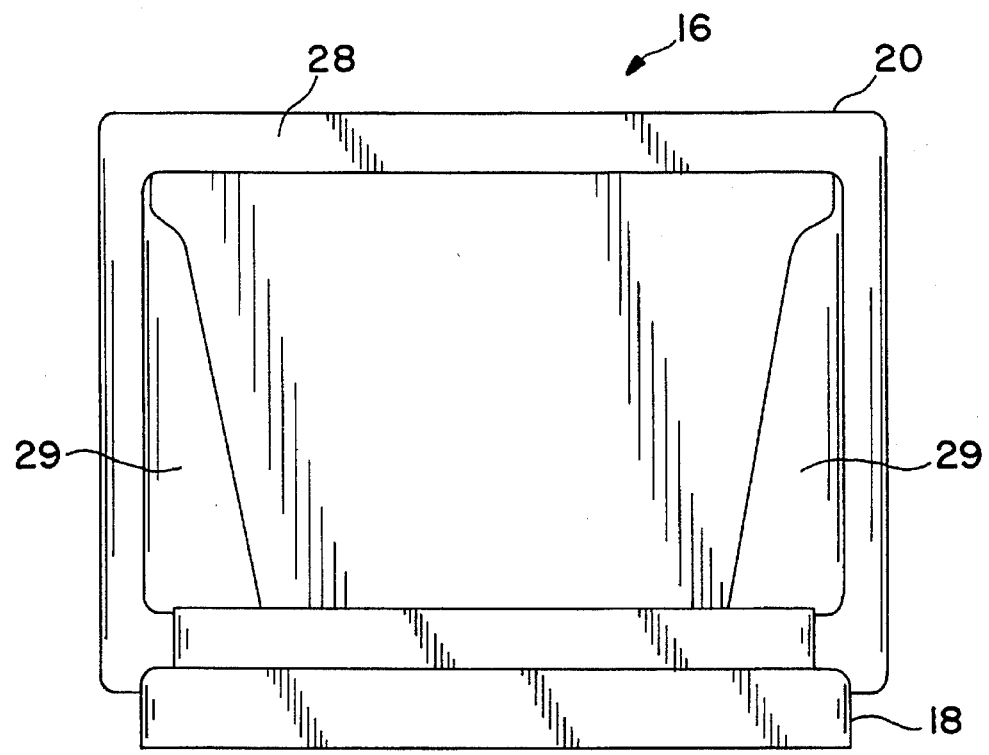
FIG. 2 is a rear elevation view of the base.
Figure 4:
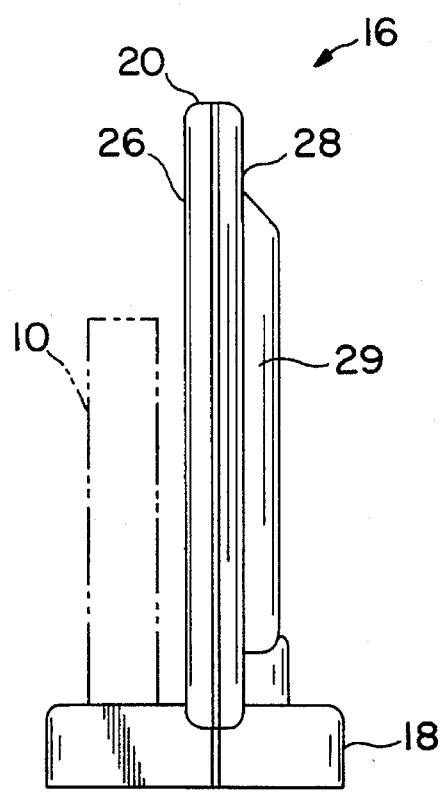
FIG. 4 is a side elevation view of the base showing an interlocking component in phantom lines.
Figure 9:
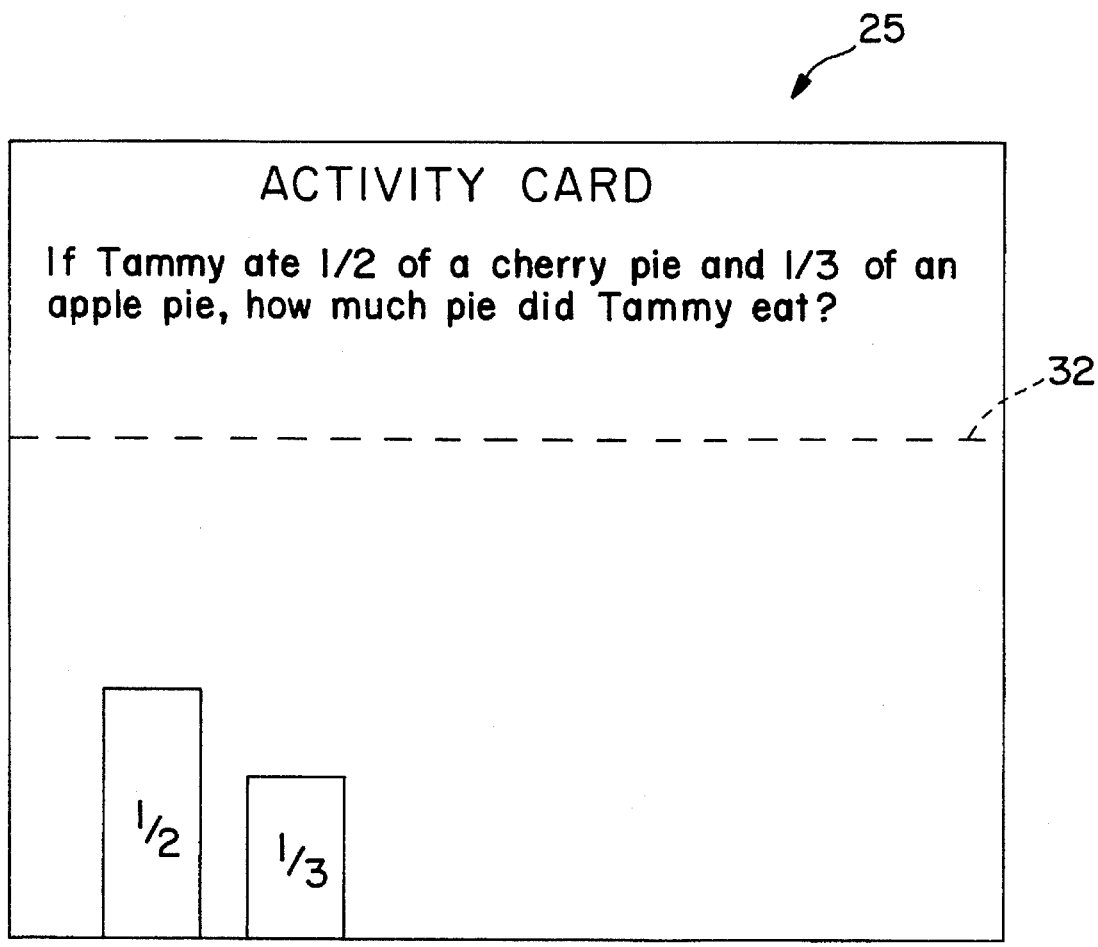
FIG. 9 is a front elevation view of an activity card.

A rear wall 20 is attached permanently to the platform 18. The size of the wall 20 is desirably about 26.3 cm in length and rises 19.5 cm in height above the platform. As shown in FIG. 4, the rear wall 20 contains a front side 26 confronting the stations 22 and an opposing back side 28. Two vertically extending display slots 23 are formed between flanges 24 and the front side 26 of the wall 20. The display slots 23 are appropriately sized for receiving activity cards 25, as shown in FIG. 3. The activity cards 25 can be slid into slots 23 so that they are displayed behind the components 10 located at stations 22. As shown in FIG. 9, the activity cards 25 may be single or double-sided and contain word problems, illustrated problems or activities for the students to solve using the various interlocking components 10. The back side 28 of the rear wall 20 includes another pair of flanges 29 at opposite ends of back side 28, as shown in FIG. 2. These flanges define storage slots 30 for storing activity cards 25.

As shown in FIG. 1, a horizontal unit line 32 is engraved or screen printed across the front side 26 of the wall 20 to indicate one unit height, i.e., the height of one or more interlocked components equal in value to "one." The unit line 32 provides a visual measurement by which students may make comparisons as well as recognize equivalences.

To use the components 10 with the base 16, the male end 12 of a component 10 is inserted into a station 22. A second component can be interlocked on top of the first component by inserting the male end 12 of the second component into the female end 14 of the first component to form a first column. Additional components can attached in a like manner to increase the length of the first column. Additional columns can be positioned at other stations 22.

The components 10 can also be formed into columns without the base 16. Instead of forming the columns vertically above stations 22, the columns can be formed horizontally on a table top or the like by interlocking components 10 in the same manner as described above.

The ability to combine the components 10 provides a basis for students to explore equivalences by modeling fractions, decimals and percents with equal values. The interlocking components 10 also provide a geometric equivalence model by comparison through length. This model is an exacting reference for checking computation and developing operational skills.

The following examples are intended to be illustrative of the various applications for the present invention. These examples are not intended to limit the scope or usefulness of the invention in any way. For instance, the following examples could alternatively be performed using decimals or percents.

EXAMPLE 1

Simple Addition

To perform simple addition using the components, for example ½+⅓, the user would interlock a pink ½ component with an orange ⅓ component to create a first column, and then separately combine smaller components, all of the same denomination or value, to create a second column which equals the length or the height of the first column. Thus, three teal ⅙ components, (which are of equivalent height to one pink ½ component) would be selected and interlocked with two teal ⅙ components (which are of equivalent height to one orange ⅓ component) to yield a column containing five teal ⅙ components. By comparing the length of the first and second columns, the user could verify their equivalence and conclude that the answer is ⅚.

EXAMPLE 2

Complex Addition

A problem such as ⅔+⅚ can be solved using the present invention because the components can be combined to allow an answer which is an improper fraction and that answer can be converted to a mixed number. Here, the user would build a first column containing two orange ⅓ components and five teal ⅙ components and then compare its length or height to that of the red 1 component or to the unit line 32 on the rear wall of the base. Because the total value of the first column is greater than one, the three teal ⅙ components which extend beyond the length or height of the red 1 component represent the remainder above one and are removed from the top of the first column and placed in a second column. The three teal ⅙ components can then be compared and found to be equivalent to one pink ½ component, thereby yielding an answer column of 1 ½.

EXAMPLE 3

Addition and Inequalities

The components present a quick and easy way to solve inequality problems. For example, to determine if ½+¾+⅙+⅗ is greater than one, the user would simply interlock one pink ½ component, three yellow ¼ components, one teal ⅙ component and three green ⅕ components into a first column. By visually comparing the length or height of the resulting first column to the red 1 component, the user could readily determine that the sum of the fractions is greater than one. To determine if the sum is also greater than two, the user would remove those components from the first column which extend beyond the red 1 component or beyond the unit line 32 on the rear wall, i.e., the one yellow ¼ component, one teal ⅙ component and three green ⅕ components, compare the length of the second column comprising these removed components to the red 1 component, and find shall they too are slightly greater than the red 1 component. Accordingly, the sum of the fractions is also greater than two.

EXAMPLE 4

Simple Subtraction

To perform simple subtraction using the components, for example 1 minus ⅔, the user would convert the one into thirds and interlock three orange ⅓ components. Two of the components would then be removed, yielding one orange ⅓ components and an answer column of ⅓.

EXAMPLE 5

Complex Subtraction

To solve a problem such as ⅚ minus 5/12, the user would first convert five teal ⅙ components into ten black 1/12 components and then remove five of them leaving five black 1/12 components and an answer column of 5/12.

EXAMPLE 6

Simple Multiplication

A multiplication problem such as 3×3/10 can be solved by forming three columns, each having three purple 1/10 components. The user would then combine. all three columns together to form an answer column of nine purple 1/10 components and an answer of 9/10.

EXAMPLE 7

Simple Division

To solve a problem such as ¼÷3, the user would convert the fraction ¼ into a fraction of three equal parts (3/12) and then divide by 3. The correct answer would be revealed to be 1/12.

EXAMPLE 8

Algebra

Algebraic problems may be explored using the invention by combining color and numeric values of each interlocking component. The fraction problem ½+½=1 may be described algebraically as 1 pink+1 pink=1 whole. This may be simplified to read 2 p=1. Thus, "p" or pink has a value of ½. Similarly, under the following color codes: Red=r, Teal=t, Pink=p, Blue=b, Orange=o, Purple=e, Yellow=y, Black=k, and Green=32 g, distribution, associativity, commutability, and substitution may be demonstrated.

If "y" is equal in value to "2b" and $2y+4b+2y+4b=2$ then, $4y+8b=2$ $4(y+2b)=2$ $4(2b+2b)=2$ Thus, "y" has a value of ¼ and "b" has a value of ⅛.

While the present invention is described above in connection with illustrative embodiments, these embodiments are not intended to be exhaustive or limiting of the invention. Rather, the invention is intended to cover all alternatives, modifications, and equivalents included within its spirit and scope, as defined by the appended claims.

What is claimed is:

1. An assembly for teaching mathematical concepts comprising removably interlocking components, each of said components having a hollow body and means at opposite ends of said body for connecting one component to another, said connecting means comprising a male end and a female end, said female end being an open end of said body and sized to receive and frictionally retain a male end of another component, each body having a predetermined length, said assembly including bodies of at least two different lengths, whereby the length of each of said bodies indicates an assigned mathematical value and the sum of lengths of any given number of assembled bodies provides an overall length which indicates the sum of the assigned mathematical values for said given number of said assembled bodies.

2. The assembly of claim 1 wherein an unlimited number of components can be interlocked together in vertical or horizontal columns.

3. The assembly of claim 1 wherein each of the components include indicia for a mathematical value.

4. The assembly of claim 1 wherein each component of equal mathematical value is of the same color.

5. An assembly for teaching mathematical concepts comprising:

interlocking components, each of said components having a body and means at opposite ends of said body for connecting one component to another, said connecting means comprising a male end and a female end, said female end being sized to receive and frictionally retain a male end of another component, each body having a predetermined length, said assembly including bodies of at least two different lengths, whereby the length of each of said bodies indicates an assigned mathematical value and the sum of lengths of any given number of assembled bodies provides an overall length which indicates the sum of the assigned mathematical values for said given number of said assembled bodies;

a base for receiving said components, said base comprising a platform for receiving said components in columns constructed upwardly from said platform; and means at said base for retaining multiple columns of components, each of said means engaging not more than one component.

6. The assembly of claim 5 wherein said interlocking components are removably interlocking components, and each female end is an open end of said body which is sized to receive and frictionally retain a male end of another component.

7. The assembly of claim 5 wherein the base further comprises a rear wall supported by said platform.

8. The assembly of claim 7 wherein the rear wall has a front side and a back side, said front side confronting said column retaining means.

9. The assembly of claim 7 wherein each of said column retaining means is an aperture in said platform.

10. An assembly for teaching mathematical concepts comprising:

interlocking components, each of said components representing a mathematical value:

a base for receiving said components, said base having a platform and a rear wall:

aperture means at said base for retaining multiple columns of components, each of said aperture means engaging not more than one component:

said rear wall of said base having a front side and a back side, said front side confronting said column retaining means; and flanges formed on said front side of the rear wall defining card display slots.

11. An assembly for teaching mathematical concepts comprising:

interlocking components, each of said components representing a mathematical value;

a base for receiving said components, said base having a platform and a rear wall;

aperture means at said base for retaining multiple columns of components, each of said aperture means engaging not more than one component;

said rear wall of said base having a front side and a back side, said front side confronting said column retaining means, and means included with said front side for defining the length of a column of components equal in value to one.

12. An assembly for teaching mathematical concepts comprising:

interlocking components, each of said components representing a mathematical value:

a base for receiving said components said base having a platform and a rear wall;

aperture means at said base for retaining multiple columns of components, each of said aperture means engaging not more than one component;

said rear wall of said base having a front side and a back side, said front side confronting said column retaining means, and flanges formed on said back side of the rear wall defining card storage slots.

13. An assembly for teaching mathematical concepts comprising:

a plurality of removably interlocking components each having a hollow body and two opposing connecting ends, one of said connecting ends having a reduced cross section relative to said hollow body, said bodies having predetermined lengths, said assembly including bodies of at least two different lengths, wherein each body of the same length represents a particular mathematical value, said components capable of interlocking with or disassembling from each other at their connecting ends to form one or more columns of selected length, wherein each column of different length represents a different mathematical value; and a base for receiving said components in vertical columns of one or more components, said base including means for engaging only the bottom component in each column.

* * * * *